United States Patent [19]

Lindblom et al.

[11] 3,794,908

[45] Feb. 26, 1974

[54] THYRISTOR RECTIFIER FOR HIGH VOLTAGE

[75] Inventors: Georg Lindblom; Karl-Erik Olsson, both of Ludvika, Sweden

[73] Assignee: Allmanna Svenska Elektriska Aktiebolaget, Vasteras, Sweden

[22] Filed: Jan. 29, 1973

[21] Appl. No.: 327,439

[30] Foreign Application Priority Data

Feb. 1, 1972 Sweden .............................. 1102/72

[52] U.S. Cl. ........... 321/27 R, 307/252 L, 307/311, 323/21, 323/22 SC, 323/23, 340/248 E

[51] Int. Cl. ........................ H02m 7/48, H03k 17/72

[58] Field of Search .........301/252 L, 311; 323/21, 323/22 SC, 23; 340/248 E, 249; 321/27 R

[56] References Cited

UNITED STATES PATENTS 3,462,619 8/1969 Grees et al...................... 307/252 Q 3,593,038 7/1971 Hylten-Cavallius et al..... 307/252 L

*Primary Examiner*—John Zazworsky

[57] ABSTRACT

A thyristor rectifier for high voltage is formed of a plurality of thyristors connected in series and each having a control circuit controlled from a common control device. Connected to each control circuit is a light emitter of semiconductor type which emits a signal for the corresponding thyristors as long as the control circuit is intact and is being properly fed and the thyristor voltage has the proper polarity.

6 Claims, 3 Drawing Figures

THYRISTOR RECTIFIER FOR HIGH VOLTAGE

BACKGROUND OF THE INVENTION

1. Field of the Invention

The present invention relates to a thyristor rectifier for high voltage comprising a number of thyristors connected in series, each one provided with a control circuit controlled from a common control device.

The invention relates to means for supervision of the individual thyristors and their condition and also to means for protecting the thyristor rectifier when there is a fault in it.

2. The Prior Art

For supervision of the condition of the thyristors it is known to arrangement light sources, for example glow lamps, parallel to the individual thyristors and thus fed from the voltage over each thyristor. In faultless thyristors the lamps will light up when the thyristor rectifier receives voltage, whereas short-circuited thyristors also short-circuit corresponding lamps. In this way, it is easily determined how many and which thyristors must be exchanged. It is however inconvenient to connect the light sources in parallel to the thyristors, since such a parallel circuit to a thyristor rectifier for high voltage must be very high resistive in order to avoid too great losses, which however involves weak light sources.

Therefore the signals will become uncertain for optoelectronical treatment. Another known possibility is to sense the voltage distribution along the thyristor rectifier by means of a voltage divider over said thyristor rectifier, for example by means of balance relays of various kinds. For the measuring voltage divider, however, the same is true as has been stated above, namely that it must be highly resistive, and further this principle entails an electrical signal transmission from rectifier potential to earth with resultant insulating problems.

SUMMARY OF THE INVENTION

Instead of this, it is suggested according to the invention to arrange signal emitters for each thyristor in the form of light emitters of semiconductor type (light-emitting diodes) connected to the control circuit of the thyristor concerned. By doing so, the advantage is achieved that the signal for the thyristor indicates the condition of both the thyristor and the control circuit, which are both of determining importance for the operation of the thyristor. For each ignition of the thyristor rectifier, it is then possible to count the number of light signals from the control circuits of the different thyristors, and, when the number is too low, to take the measures required. The thyristor rectifier according to the invention is then given a construction in which each thyristor control circuit includes a light emitter of semiconductor type which emits a signal for the corresponding thyristor as long as the control circuit is intact and is properly fed and the thyristor voltage has the proper polarity.

BRIEF DESCRIPTION OF THE DRAWINGS

The invention makes possible various forms of supervision and protection of the rectifier, as will be more specifically explained with reference to the accompanying drawing, in which FIG. 1 shows a thyristor rectifier of the kind referred to here, whereas

DESCRIPTION OF THE PREFERRED EMBODIMENTS

Figure 1:
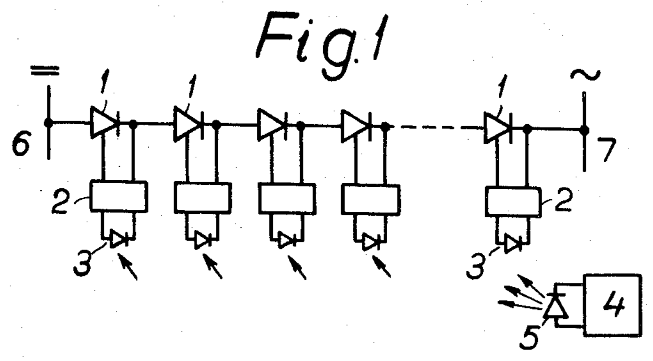

FIG. 1 shows a thyristor rectifier for high voltage with a number of thyristors 1 connected in series, each one provided with a control circuit 2 at the input side of which a detector in the form of a photo-diode 3 is arranged. All thyristors are controlled from a common control device 4 at the output side of which one or more light-emitting diodes 5 are arranged, the radiation of which affects the photo-diodes 3. Such thyristor rectifiers are used in bridge connections in static converters for transmitting high-voltage direct current, the one pole of the rectifier being connected to a d.c. bar 6, whereas the other pole is connected to an a.c. bar 7.

Figure 2:
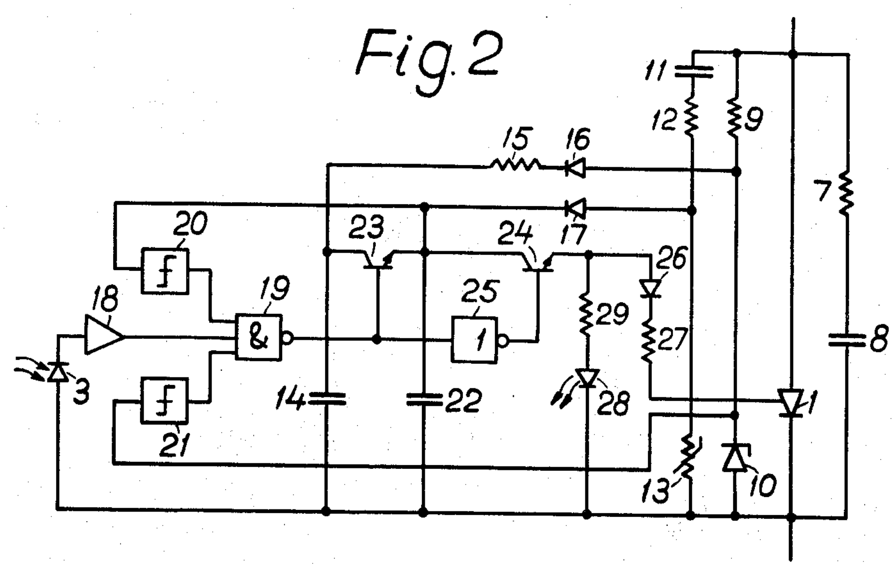
FIGS. 2 and 3 show various examples of control circuits according to the invention for the individual thyristors in the rectifier.

One example of a control circuit according to the invention is shown in FIG. 2, where the control circuit is connected between the photo-diode 3 and the control electrode and cathode of the thyristor 1. Parallel to the thyristor a resistor 7 and a condenser 8 have been arranged, which are included in the main voltage divider of the thyristor rectifier, as well as two auxiliary voltage dividers 9, 10 and 11, 12, 13. These different voltage dividers may be combined into one single voltage divider where the different voltages are taken from different terminals.

The first auxiliary voltage divider consists of a resistor 9 in series with a Zener-diode 10 and is intended to feed an energy storing means for the control circuit in the form of a relatively large condenser 14. In order to prevent this relatively large condenser from short-circuiting the voltage fluctuations over the thyristor 1, charging of the condenser is carried out over a relatively large resistor 15. The second auxiliary voltage divider consists of a condenser 11, an ohmical resistor 12 and a voltage dependent resistor 13. This voltage divider is intended to feed the other components of the control circuit, which are high-ohmical throughout and require small power, whereas the condenser 14, which is intended to store the actual control power for the thyristor, demands greater power. For this reason, there should be two separate feeding circuits. To avoid discharging of the control circuit at negative voltage over the thyristor 1, the feeding is carried out over diodes 16, 17.

As mentioned, the control circuit is provided with a detector in the form of a photo-diode 3, which, when influenced by the radiation from the light-emitting diode 5 of the control device 4, emits a signal over an amplifier 18 to an And-gate 19. Two discriminators 20, 21 have been connected to the same And-gate, the first 20 of which is intended to sense that there is sufficient excitation voltage over a condenser 22, whereas the second one 21 is intended to ensure that the thyristor voltage has the correct polarity, i.e. that the anode is positive in relation to the cathode, possibly also that the thyristor voltage has a certain smallest size. The discriminator 21 is therefore connected to the voltage divider 9, 10 as shown.

The And-gate 19 is constructed with a negative output, which means that 19 emits an output signal until all three inputs 18, 20 and 21 emit signals simultaneously. When this is done the output signal from 19 disappears.

Control energy is transferred from the condenser 14 to the thyristor 1 over the condenser 22 and the transistors 23, 24, which are controlled from the And-gate 19. As long as the detector 3 does not receive a signal, 19 gives an output signal, and the transistor 23 is kept conductive whereas the transistor 24 is kept blocked over the inversion gate 25. If the detector 3 receives a signal and the feeding and the voltage over the thyristor are correct so that 20 and 21 give signals, the signal from 19 disappears, the transistor 23 thus being blocked, whereas the gate 25 emits a control signal to the transistor 24, the energy stored in the condenser 22 being discharged over the diode 26 and the resistor 27 to the control electrode of the thyristor 1. In this way the consenser 14 is prevented from discharging since the transistor 23 is blocked. The condenser 22, being smaller than 14, can therefore be quickly charged when the signal to 3 disappears and the transistor 23 becomes conductive.

The control circuit described so far is to be regarded as an example which can be replaced by any other control circuit. In order to be able to ensure that both the thyristor 1 and the control circuit are in perfectly satisfactory condition, it is suggested, according to the invention, to introduce an indicator which in FIG. 2 consists of a light-emitting diode 28 fed parallel to the control electrode of the thyristor over a resistor 29. The power distribution between the light-emitting diode 28 and the control electrode of the thyristor is adjusted with the help of the resistors 27, 29.

It is clear that a condition for the light-emitting diode 28 to be able to give a signal is that the whole control circuit is intact, that the feeding to the control circuit works and that the thyristor voltage has the right polarity when the control device 4 gives a signal to the detector 3. In order to achieve this, however, the thyristor 1 must be without any faults since the excitation voltage over the voltage dividers 9, 10 and 11–13 disappears when the thyristor is short-circuited.

The signal from 28 will therefore work as an indication of the condition in the whole circuit shown in FIG. 2. The signals from the diodes 28 of the different thyristors can then be added in known manner and be used as an indication of the condition in the whole thyristor rectifier in FIG. 1, and when the number of signals is too low after ignition of the thyristor rectifier the proper measures can be taken. As known measures exchange of thyristors and circuits which are out of order may be mentioned, or in the first place reignition of the rectifier at the end of the conducting interval in order to prevent the remaining, blocked thyristors from becoming overloaded.

Figure 3:
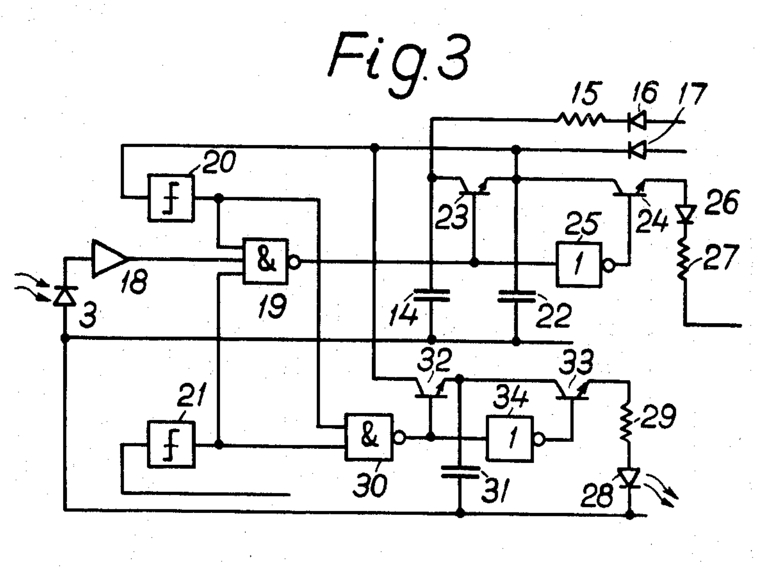

FIG. 3 shows another positioning of the light-emitting diode 28 in a control circuit which in other respects is similar to the one shown in FIG. 2. The same reference figures have been used as in FIG. 2, but the thyristor 1 and the voltage dividers have been omitted since they are exactly the same for both figures.

According to FIG. 3 the light-emitting diode 28 is independent of the actual control signal over the photodiode 3 and only influenced by the signals from the discriminators 20 and 21 over an And-gate 30, the input of which is parallel to the And-gate 19.

The light-emitting diode 28 here has its own condenser 31 which is fed parallel to the condenser 22 over a transistor 32 and is connected to the light-emitting diode 28 over another transistor 33. As long as 20 and 21 do not emit signals simultaneously, the transistor 32 is kept conductive by the negative output signal from 30. When, on the other hand, the And-gate 30 receives a double input signal, the transistor 32 is blocked and 33 is opened by the signal from the inverted gate 34, the light-emitting diode 28 being ignited by the charging from 31.

It is clear that, as long as the condenser 22 has not reached a voltage determined by the discriminator 20, the And-gate 30 will emit a control signal to the transistor 32. In this way, the charging of the condenser 31 will be made quite parallel to the charging of the condenser 22, and the light-emititng diode 28 does not emit a signal until these two condensers have been fully charged and the control circuit thus is fully prepared for ignition.

On the other hand, recharge of the condenser 31, after it has discharged over 28, cannot take place until the thyristor voltage has fallen below the voltage level determined by the discriminator 21, or the charging voltage for 22 and 32 has fallen below the voltage determined by the discriminator 20. Both these criteria, however, are fulfilled as a rule by igniting the thyristor, the voltage over it thus falling to conducting voltage level.

In the example according to FIG. 3, the ignition circuit 22, 24, 26, 27 is not loaded by the light-emitting diode 28. In this way, the circuit 30–34 can be dimensioned completely with regard to the energy that is needed for the signal from 28.

The light-emitting diodes 28 are arranged at the same potential as the corresponding thryistors, whereas the signals from them can be received and treated at earth potential without taking special measures, which is a great advantage.

We claim:

1. Thysistor rectifier for high voltage comprising a number of thyristors (1) connected in series, each one provided with a control circuit (2) controlled from a common control device (4), in which a light emitter (28) of semiconductor type is connected to each control circuit, said light emitter emitting a signal for the corresponding thyristor in dependence on the ignition of the thyristor and the voltages of the control circuit.

2. Thyristor rectifier according to claim 1, in which said signal from said light emitter (28) is emitted in dependence of the voltage over the thyristor (1) concerned.

3. Thyristor rectifier according to claim 2, characterised in that said light emitter (28) is fed from an energy storing means (31) charged from the control circuit (3) of the thyristor (1) concerned.

4. Thyristor rectifier according to claim 3, characterised in that said light emitter (28) is ignited from a control member (30, 34) controlled by the voltage over the anode-cathode of the proper thyristor (1) in such a way that said light emitter is ignited when said voltage becomes positive.

5. Thyristor rectifier according to claim 2, characterised in that said light emitter (28) is ignited by the control device (2) of the thyristor (1) concerned together with the thyristor.

6. Thyristor rectifier according to claim 5, in which said thyristor control device (2) is blocked when the voltage over the thyristor is zero or below zero.

* * * * *